(12) United States Patent
Meng et al.

(10) Patent No.: US 6,318,896 B1
(45) Date of Patent: Nov. 20, 2001

(54) ANNULAR BEARING WITH DIFFUSER AND INLET FLOW GUIDE

(75) Inventors: Sen Yih Meng, Reseda; Scott Elder McVey, Newbury Park; Richard L. Gulden, Simi Valley; Kevin Joseph Lunde, Thousand Oaks, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/438,089

(22) Filed: Nov. 10, 1999

(51) Int. Cl.[7] ..................................................... F16C 33/10
(52) U.S. Cl. .............................. 384/114; 384/118; 384/120
(58) Field of Search ..................................... 384/100, 114, 384/118, 120

(56) References Cited

U.S. PATENT DOCUMENTS

| | | | |
|---|---|---|---|
| 3,013,845 | * 12/1961 | Loch | 384/114 |
| 3,663,072 | * 5/1972 | Cvacho | 384/13 |
| 4,129,344 | 12/1978 | Hormann et al. | |
| 4,222,705 | 9/1980 | Smith | |
| 4,426,118 | * 1/1984 | Mohsin | 384/121 |
| 4,834,559 | 5/1989 | Kalvoda | |
| 5,054,583 | 10/1991 | Wrzyszczynski | |
| 5,415,478 | 5/1995 | Matthews et al. | |
| 5,433,528 | * 7/1995 | San Andres | 384/100 |
| 5,503,478 | * 4/1996 | Blaine | 384/100 |
| 5,702,186 | * 12/1997 | Hackstie et al. | 384/117 |
| 6,053,636 | * 4/2000 | Pelfrey et al. | 384/114 |

FOREIGN PATENT DOCUMENTS 2042 095-A * 9/1980 (GB).

* cited by examiner

*Primary Examiner*—David A. Bucci
*Assistant Examiner*—William C Joyce
(74) *Attorney, Agent, or Firm*—Alston & Bird LLP

(57) ABSTRACT

An annular fluid film bearing is formed of a stator ring and a rotatable element concentrically mounted within the stator ring such that an annular clearance is defined between the inner surface of the stator ring and the outer surface of the rotatable element. Fluid flows through the annular clearance, and hydrostatic pressure of the fluid in the clearance provides radial support to the rotatable element and stiffness and damping for the bearing. A diffuser and inlet flow guide is mounted adjacent the inlet end of the annular bearing clearance. The diffuser and inlet flow guide comprises a ring having a plurality of flow passages formed in its inner surface facing the rotatable element. The flow passages are configured to turn the fluid approaching the inlet of the annular bearing clearance such that the fluid entering the annular clearance has a tangential velocity opposite to the direction of rotation of the rotatable element. The flow passages also include diffuser portions that diffuse the fluid to increase its static pressure prior to entering the annular clearance.

19 Claims, 3 Drawing Sheets

ANNULAR BEARING WITH DIFFUSER AND INLET FLOW GUIDE

FIELD OF THE INVENTION

The invention relates to fluid film bearings and, more particularly, to an annular fluid film bearing formed by a stationary element and a rotating element that are concentrically mounted such that an annular clearance is defined between the elements for the flow of fluid therethrough.

BACKGROUND OF THE INVENTION

Rotating machines generally include bearings enabling the rotating portion of the machine to rotate relative to stationary portions of the machine without excessive frictional forces being exerted on the rotating portion. One class of bearings is characterized by rolling elements, such as balls or rollers, confined in a raceway defined between inner and outer ring-shaped races. The rotating portion of the machine is fixed to one of the races, and as it rotates about the axis defined by the bearing, the rolling elements roll along the surfaces of the races. In many rotating machines, bearings of this type are capable of providing relatively long bearing life and meeting the desired performance characteristics.

Fluid film bearings define another class of bearings. In a fluid film bearing, a film of fluid is disposed in a space defined between the rotating and stationary bearing elements. Thus, instead of rolling elements, fluid is used for supporting the rotating bearing element and preventing contact between the rotating bearing element and the stationary bearing element. Because there is no metal-to-metal contact within the bearing, galling and other types of physical degradation of the bearing caused by metal-metal contact are reduced or eliminated. Fluid film bearings in many cases can also offer improved damping compared to ball or roller bearings, and the damping characteristics can be tuned by suitable selection of the clearance between the rotating and stationary bearing components, surface finish of the bearing components, and other factors, in order to provide the desired performance characteristics. Thus, fluid film bearings can offer improved performance relative to conventional ball or roller bearings, especially for very high-speed machinery such as turbopumps or the like.

Annular fluid film bearings are used in some types of rotating machines. An annular bearing has a relatively small radial clearance between the rotating element and the stationary element, and hydrostatic pressure of the fluid within the clearance supports the rotating element in the radial direction and enables the rotating element to rotate. The fluid in the annular clearance provides stiffness and damping for the bearing. In some types of high-performance machines, the rotating component frequently must operate at a speed that is above the first and second shaft critical speeds. In order to avoid high vibrations when passing through the critical speeds, the rotating component, and therefore the bearings, should have a high degree of direct damping and stiffness and a low cross-coupled stiffness.

SUMMARY OF THE INVENTION

The present invention facilitates increased damping and stiffness and reduced cross-coupled stiffness in an annular fluid film bearing, by providing a diffuser and inlet flow guide for the bearing. The diffuser and flow guide increases the static pressure of the fluid entering the annular bearing, which has been found to improve the direct damping and stiffness of the bearing. The diffuser and flow guide also reduces the tangential velocity of the fluid entering the annular clearance of the bearing. It has been found that a high tangential velocity of the fluid within the annular bearing clearance causes a destabilizing drag force on the rotating element. By reducing the tangential velocity of the fluid, the diffuser and flow guide reduces the destabilizing force on the rotating element, thereby improving the dynamic stability of the bearing.

In accordance with a preferred embodiment of the invention, an annular bearing includes a rotatable element mounted for rotation about an axis of the bearing, and a stationary element mounted concentrically with the rotatable element and radially spaced therefrom such that an annular clearance is defined therebetween for the flow of fluid therethrough from an inlet end of the annular clearance to an outlet end thereof. The bearing also includes a diffuser and inlet flow guide proximate the inlet end of the annular clearance and mounted such that the rotatable element rotates relative to the diffuser and inlet flow guide. The diffuser and flow guide includes a plurality of vanes defining a plurality of flow passages spaced about a circumference of the diffuser and flow guide. The flow passages are operable to reduce the tangential velocity of the fluid flowing through the annular clearance and to diffuse the fluid so as to increase the static pressure of the fluid entering the annular clearance.

In accordance with a further preferred embodiment of the invention, the stationary element comprises a stator ring that surrounds the rotatable element and has an inner surface opposing the rotatable element, and the diffuser and inlet flow guide comprises a diffuser ring having an inner surface that opposes the rotatable element and is spaced therefrom by a radial clearance, the flow passages comprising slots formed in the inner surface of the diffuser ring. Preferably, the flow passages are configured to turn the fluid such that fluid exiting the diffuser ring is axial or has a tangential velocity component opposite to the rotation of the rotatable element.

Each flow passage advantageously has an entrance portion extending from an upstream end of the diffuser ring in a generally circumferential direction corresponding to the direction of rotation of the rotatable element, and a turning portion for turning the fluid such that the fluid leaving the diffuser ring and entering the bearing clearance is axial or has a tangential velocity component opposite to the direction of rotation of the rotatable element. Preferably, the turning portions of the flow passages are configured to turn the fluid such that the fluid exiting the diffuser ring is directed in a generally circumferential direction opposite to the rotation of the rotatable element. The entrance portion of each passage preferably is aligned with the direction of fluid flow at the upstream end of the diffuser ring. Generally, the fluid approaching the diffuser ring can vary from axial to highly tangential, and thus may have a flow angle of about 0° to 90° relative to the axial direction of the bearing. Accordingly, the entrance portion of each passage preferably defines a helix angle of about 0° to 90° (measured from the axial direction) such that fluid approaching the diffuser ring will be captured by and enter the entrance portion with minimal loss of total pressure. The exit portion preferably defines a helix angle of about 0° to −90° (where −90° denotes the direction opposite to rotation of the rotatable bearing element) such that fluid exiting the diffuser ring and entering the bearing clearance will enter the clearance in an axial direction or in a direction having a tangential component opposite to rotation, thereby reducing the tangential velocity of fluid within the clearance.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
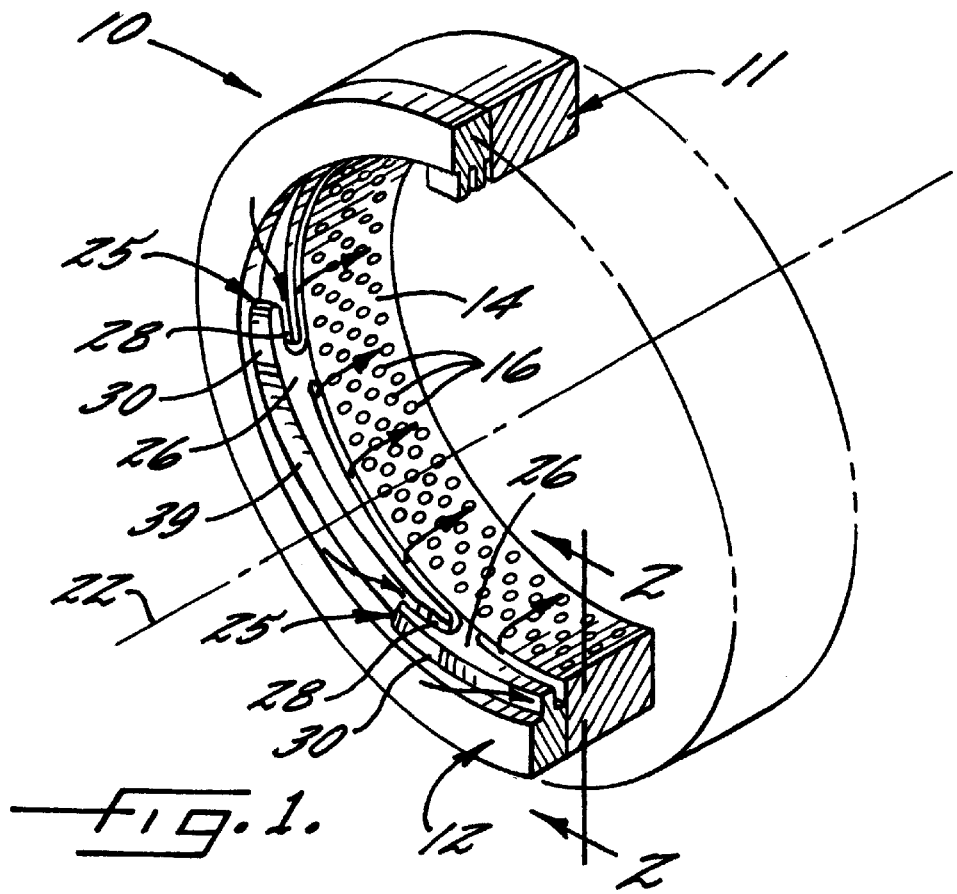
FIG. 1 is a perspective view of a 180° circumferential sector of a stationary portion of an annular bearing in accordance with a preferred embodiment of the invention, showing a diffuser and inlet flow guide mounted adjacent to an inlet side of a stator ring.
Figure 2:
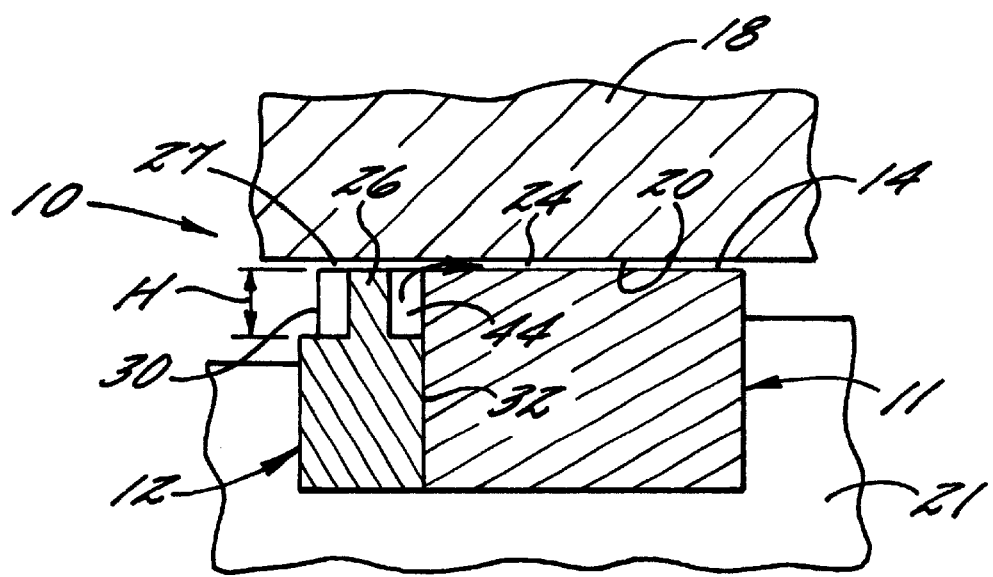
FIG. 2 is a cross-sectional view taken on line 2—2 of FIG. 1, also showing the rotatable element of the bearing.

With reference to FIGS. 1–6 an annular fluid film bearing 10 in accordance with a preferred embodiment of the invention is shown. FIG. 1 depicts the stationary portion of the annular bearing comprising a stator ring 11 and a diffuser and inlet flow guide 12. The stator ring 11 defines a generally cylindrical inner surface 14, although it may have features, such as dimples or pockets 16 as shown, for imparting a desired effective roughness to the inner surface 14. As shown in FIG. 2, the stator ring 11 surrounds a rotatable element 18 of the annular bearing, the rotatable element 18 defining an outer surface 20 that is generally cylindrical. The stator ring 11 is fixed within a housing or casing 21 that includes means for supplying fluid to the bearing and sealing the fluid within the bearing (not shown).

The outer surface 20 of the rotatable element and the inner surface 14 of the stator ring are concentric about an axis 22. The diameter of the outer surface 20 is slightly smaller than that of the inner surface 14 of the stator ring, such that an annular space or clearance 24 is defined therebetween. The annular clearance 24 advantageously has a radial thickness or height between about 0.0003 inch and 0.010 inch. Fluid is supplied to the bearing through passages (not shown) such that the annular clearance 24 is filled with fluid. The rotatable element 18 is supported in the radial direction by hydrostatic pressure of the fluid within the annular clearance 24, so that there is no contact between the outer surface 20 of the rotatable element and the inner surface 14 of the stator ring 11.

As the rotatable element 18 rotates about its axis 22, the fluid within the annular clearance 24 tends to be entrained by the rotatable element 18, through viscous shear forces exerted between the fluid and the rotatable element. Accordingly, the fluid within the clearance 24 acquires a tangential velocity component, the magnitude of which depends on the radial thickness of the annular clearance 24, the tangential velocity of the rotating surface 20, the viscosity of the fluid, and other factors. In general, the smaller the clearance 24, the closer the average tangential velocity of fluid in the clearance will be to the tangential velocity of the rotating surface 20. As a result of the fluid being dragged around with the element 18, the rotatable element experiences a drag force whose magnitude is essentially a function of the average tangential fluid velocity in the clearance. It has been found that this drag force acts out of phase with the rotation of the rotatable element and tends to destabilize the rotatable element. More particularly, the drag force tends to increase the cross-coupled stiffness of the bearing. The industry standard stability parameter for bearings and seals is the whirl frequency ratio (WFR). The WFR is the ratio of the destabilizing force (or cross-coupled stiffness) to the stabilizing force (or direct damping). Thus, the stability of a bearing is directly related to the cross-coupled stiffness. The out-of-phase drag force on the rotatable element has been found to increase the cross-coupled stiffness, and hence to the adversely affect the stability, of the bearing.

In some types of annular bearings, fluid continually flows through the annular clearance as a result of a pressure differential across the bearing, i.e., fluid pressure at an inlet side of the bearing exceeds the pressure within the sump or reservoir to which the fluid flows after passing through the bearing clearance. Where fluid is supplied to the inlet of the bearing with an initial tangential velocity, such as may occur, for example, when the fluid supplied to the bearing passes first through an impeller of a pump, the destabilizing effect of the drag force can be exacerbated because the fluid tangential velocity within the clearance can be even higher than what would be imparted to the fluid by the rotatable bearing element alone.

The present invention addresses the problem of bearing destabilization by providing the diffuser and inlet flow guide 12, which guides the flow entering the annular clearance 24 so that the tangential velocity of fluid within the clearance is reduced relative to a bearing that does not include the diffuser and flow guide 12. The diffuser and flow guide 12 also diffuses the fluid before it enters the clearance 24 so as to increase the static pressure of the fluid. By virtue of the reduced tangential velocity of the fluid in the clearance, the cross-coupled stiffness of the bearing is reduced. Additionally, the increased static pressure of the fluid leads to increased direct stiffness and damping. The combination of lower cross-coupled stiffness and higher direct stiffness and damping provides the potential for significantly improved bearing stability.

Figure 3:
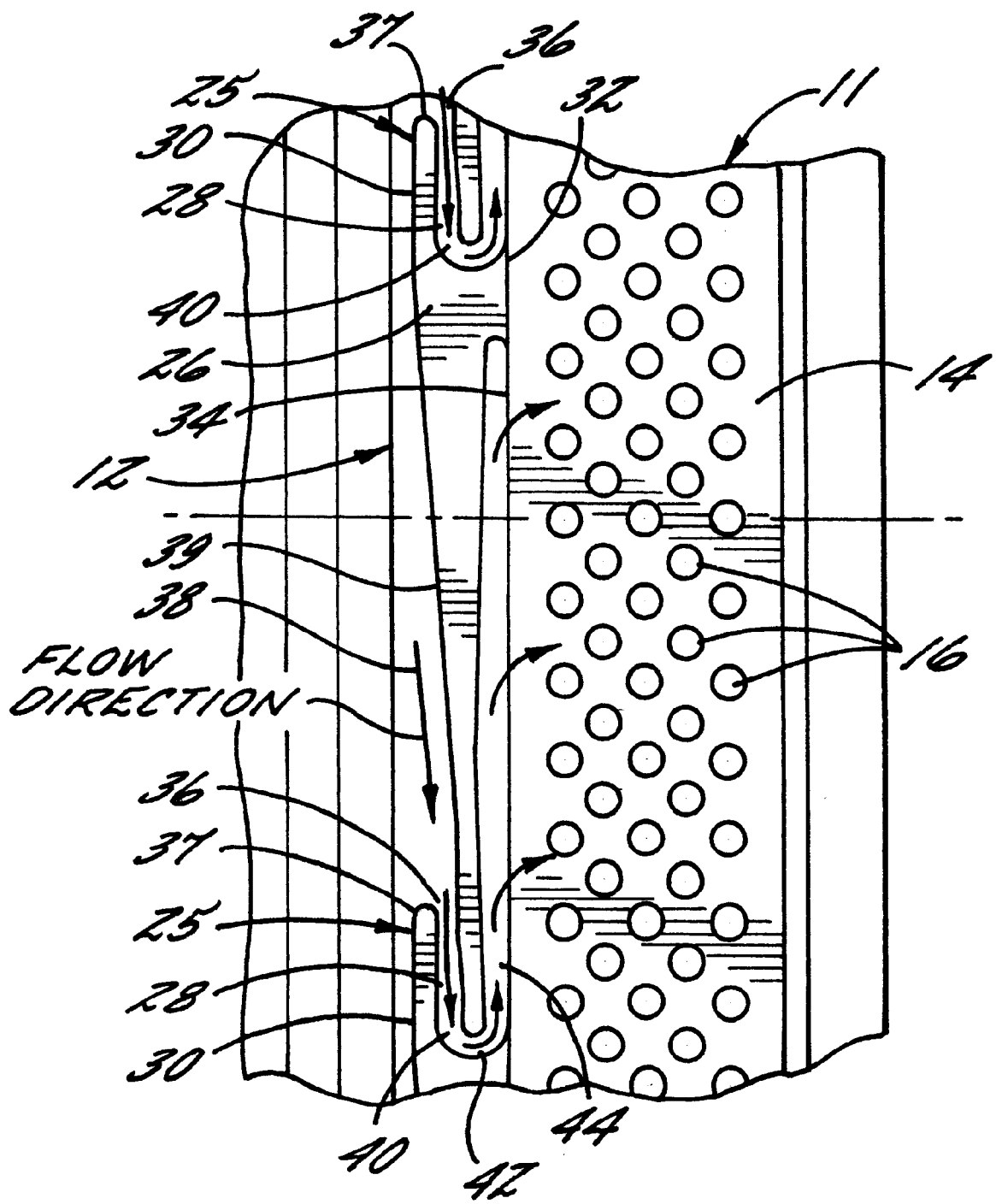
FIG. 3 is an unwrapped fragmentary plan view of the diffuser and inlet flow guide and stator ring for the annular bearing as shown in FIG. 1.
Figure 4:
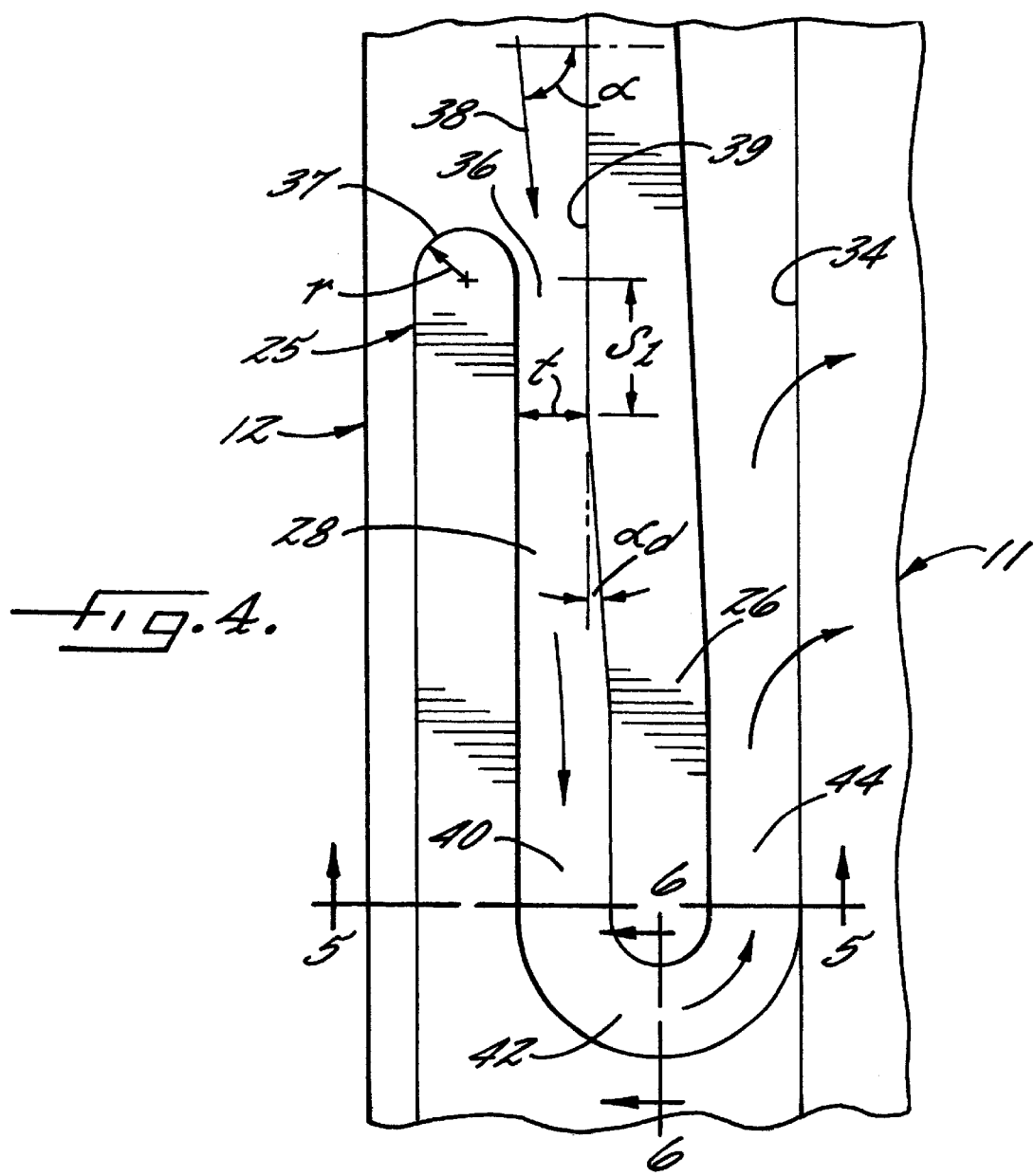
FIG. 4 is an enlarged view similar to FIG. 3, showing in greater detail the vane, diffuser, and turning portion of the inlet flow guide.

With reference to FIGS. 1, 3, and 4 in particular, the diffuser and flow guide comprises a ring having a plurality of circumferentially spaced vanes 25 between which are defined a plurality of slots or flow passages 28. The inner surface 26 of the flow guide 12 is essentially flush with the inner surface 14 of the stator ring 11 and is opposed by the outer surface 20 of the rotatable element 18 as shown in FIG. 2. The inner surface 26 of the flow guide is radially spaced from the rotatable element 18 such that an annular clearance 27 is defined therebetween. The annular clearance 27 has about the same radial thickness as the bearing annular clearance 24, and is much smaller than the height and width dimensions of the flow passages 28. Thus, fluid approaching the inlet end of the annular clearance 24 will first flow through the flow passages 28 defined in the flow guide 12. In the particular flow guide 12 illustrated in the drawings, there are five vanes 25 and five flow passages 28 spaced equally about the circumference of the flow guide. The number of vanes 25 and flow passages 28 can be varied to suit the particular application in which the bearing is to be used.

Each flow passage 28 originates at an upstream or front end face 30 of the diffuser and flow guide 12, and terminates at a downstream or rear end face 32 of the flow guide. The rear end face 32 abuts an upstream end face 34 of the stator ring 11. Each flow passage 28 has an entrance portion 36 whose orientation is selected to correspond generally to the inlet flow direction of fluid entering the bearing. In the particular bearing shown in the drawings, an impeller (not shown) of a pump is upstream of the bearing and is rotatably supported by the rotatable element 18 (FIG. 2), and the fluid entering the bearing passes first through the impeller such that the flow exiting the impeller and entering the bearing is a swirling flow having a substantial tangential velocity component, as illustrated by arrow 38 in FIG. 3. Thus, the entrance portion 36 of each flow passage extends in a generally circumferential direction corresponding to the direction of rotation of the rotatable element of the bearing. More generally, however, the entrance portion 36 can extend along a direction defining a helix angle of about 0° to 90° so as to generally match the flow helix angle. The vanes 25 are likewise generally aligned with the inlet flow direction. Preferably, the entrance portion 36 is preceded (in the flow direction) by a gradually sloping wall 39 that helps guide the fluid into the entrance portion 36. The entrance portion 36 serves as an inlet straight section for the diffuser 40 described below.

The fluid exiting the entrance portion 36 is diffused in a diffuser portion 40 of flow passage 28. The diffuser portion 40 comprises a diverging portion of the flow passage whose flow area increases in the flow direction. Accordingly, fluid flowing through the diffuser portion 40 is reduced in velocity and the static pressure of the fluid increases. The amount of diffusion provided by the diffuser portion 40 advantageously can be selected to suit the particular application. In general, increasing the static pressure of the fluid entering the annular clearance of the bearing will increase the direct stiffness and damping of the bearing, which will correspondingly alter the dynamic characteristics of the bearing. Of course, there is a limit to how much diffusion can be achieved before the fluid separates from the walls of the flow passage and the diffusion effect ceases. In general, the diffuser area ratio (i.e., the ratio of exit flow area to inlet flow area) should be less than about 4. The divergent angle $\alpha_d$ (FIG. 4) of the diffuser portion 40 should be less than about 8° to minimize diffuser losses.

After passing through the diffuser portion 40, the fluid is turned by a turning portion 42 of each flow passage 28. Advantageously, the turning portion 42 turns the flow so that the fluid exiting the flow passage 28 and entering the annular clearance of the bearing is generally axial or has a counter-swirl (i.e., has a tangential velocity component opposite to the direction of rotation of the rotatable bearing element). Accordingly, the turning portion 42 preferably turns through an angle of about 90° to 180° relative to the direction of the entrance portion 36 and diffuser portion 40, which extend along generally the same direction. The flow area through the turning portion 42 advantageously should be constant or nearly constant.

After being turned in the turning portion 42, the fluid flows into an exit portion 44 adjacent the upstream end face 34 of the stator ring 11, and from there the fluid enters the annular clearance 24 as best seen in FIG. 2. The exit portion 44 advantageously is elongated in the circumferential direction. In the illustrative embodiment shown in the drawings, the exit portion 44 extends nearly to the adjacent flow passage 28 such that the exit portions 44 collectively take up a majority of the circumference of the diffuser and flow guide 12. The exit portion 44 advantageously extends along a direction defining a helix angle of about 0° to −90°, negative helix angles denoting directions opposite to the rotation of the rotatable element 18.

The diffuser and flow guide 12 has five passages 28. It will be appreciated, however that the number of passages for optimum performance can vary depending on the particular bearing configuration. In general, the number of passages is mainly determined by the flow rate of fluid through the bearing clearance 24, the radial height of the clearance, and the overall bearing length. With reference to FIG. 4, other factors that can influence the optimum number of passages include the helix angle α of the flow upstream of the passages, and the diffuser design parameters such as the radius of curvature r of the diffuser vane leading edge 37, the length $S_1$ of the inlet straight section 36, and the diffuser area ratio.

For good diffuser designs with minimal losses, it is advantageous to configure the passages 28 and vanes 25 such that the length $S_1$ of the inlet straight section 36 is about one to two times the diffuser inlet throat widtht (FIG. 4). The inlet straight section 36 functions to improve the uniformity of the flow before it enters the diffuser 40. The inlet throat width t should usually be about equal to the vane height H (FIG. 3).

Figure 5:
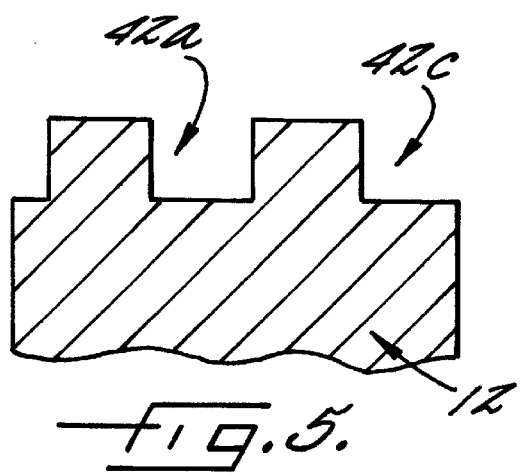
FIG. 5 is a cross-sectional view taken on line 5—5 of FIG. 4.
Figure 6:
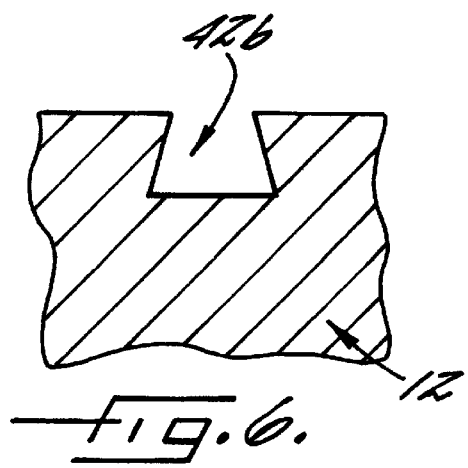
FIG. 6 is a cross-sectional view taken on line 6—6 of FIG. 4.

The turning section 42 typically turns the flow through a large angle, as much as 180°. Consequently, there is the potential for significant losses to occur in the turning section 42. To minimize these losses, the turning section 42 can include variable-section geometry as described in Gerlach, C. R., "Study of Minimum Pressure Loss in High Velocity Duct System", NASA 102499, Nov. 3, 1967. FIGS. 5 and 6 illustrate such a variable-section turning section 42. As shown in FIG. 5, at the entrance 42a to the turning section 42, the cross-sectional flow area is generally rectangular such that the width of the flow area at the outer radius is about equal to the width at the inner radius. The flow area cross section is similarly shaped at the exit 42c from the turning section. However, as shown in FIG. 6, in the turning region 42b of the turning section 42, the flow area cross section is varied such that the width at the inner radius is greater than the width at the outer radius. The flow area cross section smoothly transitions from the entrance 42a through the turning region 42b and to the exit 42c. This type of variable-section turning section has the potential to reduce losses in the turning section by as much as 40 percent.

As evident from the foregoing, the diffuser and flow guide 12 guides the fluid into the inlet of the annular clearance 24 such that the fluid has a tangential velocity component opposite to the rotation of the rotatable element 18. As a result, the net tangential velocity of the fluid within the clearance 24 is reduced relative to what it would be if there were no diffuser and flow guide 12 upstream of the clearance. The reduction in tangential velocity of the fluid leads to a reduction in the magnitude of the destabilizing drag force that acts on the rotatable element 18 in the circumferential direction, the drag force essentially being a function of the square of the fluid's average tangential velocity in the clearance. Reducing the magnitude of the drag force has the effect of reducing the cross-coupled stiffness of the bearing.

Additionally, the diffuser and flow guide 12 recovers a portion of the dynamic energy of the fluid entering the bearing and converts the energy into a rise in static pressure of the fluid. This increased fluid static pressure has the effect of increasing the direct stiffness and damping of the bearing. The diffuser and flow guide 12 thus provides potentially significant improvement in dynamic stability of the bearing.

Many modifications and other embodiments of the invention will come to mind to one skilled in the art to which this invention pertains having the benefit of the teachings presented in the foregoing descriptions and the associated drawings. For example, while the annular bearing 10 has the stationary bearing element formed as an outer ring 11 surrounding the rotatable bearing element 18, an annular bearing in accordance with the present invention can alternatively have the rotatable bearing element formed as an outer ring surrounding a stationary bearing element, in which case the diffuser and inlet flow guide is also surrounded by the rotatable element and has flow passages formed in its outer surface opposing the rotatable element. Other modifications can also be made. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An annular fluid film bearing, comprising:
    a rotatable element mounted for rotation about an axis of the bearing;
    a stationary element mounted concentrically with the rotatable element and spaced radially therefrom such that an annular clearance is defined therebetween for the flow of fluid therethrough from an inlet end of the annular clearance to an outlet end thereof, rotation of the rotatable element causing the fluid flowing through the annular clearance to have a tangential component of velocity in the direction of rotation; and
    a diffuser and inlet flow guide proximate the inlet end of the annular clearance and mounted such that the rotatable element rotates relative to the diffuser and inlet flow guide, the diffuser and inlet flow guide including a plurality of flow passages that are operable to reduce the tangential velocity of the fluid flowing through the annular clearance and to diffuse the fluid so as to increase the static pressure of the fluid entering the annular clearance, whereby dynamic stability of the bearing is enhanced.

2. The annular bearing of claim 1, wherein the flow passages are configured to turn the fluid such that fluid exiting the diffuser and inlet flow guide has a tangential velocity component opposite to the rotation of the rotatable element.

3. The annular bearing of claim 2, wherein the stationary element comprises a stator ring that surrounds the rotatable element and has an inner surface opposing the rotatable element, and wherein the diffuser and inlet flow guide comprises a diffuser ring having an inner surface that opposes the rotatable element and is spaced therefrom by a radial clearance, the flow passages comprising slots formed in the inner surface of the diffuser ring.

4. The annular bearing of claim 3, wherein each slot has a diffuser portion extending along a direction defined by a helix angle of about 0° to about 90°, and a turning portion for turning the fluid through an angle such that the fluid has a tangential velocity component opposite to the direction of rotation of the rotatable element.

5. The annular bearing of claim 4, wherein the turning portions of the slots are configured to turn the fluid through an angle of about 180° such that the fluid exiting the diffuser and inlet flow guide is directed in a generally circumferential direction opposite to the rotation of the rotatable element.

6. The annular bearing of claim 4, wherein the turning portion of each slot is downstream of the diffuser portion.

7. The annular bearing of claim 4, wherein each slot includes an inlet straight section leading into the diffuser portion.

8. The annular bearing of claim 4, wherein the diffuser portion of each slot has an exit-to-inlet area ratio less than about 4.

9. The annular bearing of claim 4, wherein the turning portion of each flow passage has a flow area cross section whose shape varies along the flow direction.

10. A diffuser and inlet flow guide for an annular fluid film bearing of the type having a rotatable element mounted for rotation about an axis of the bearing and a stationary element mounted concentrically about the rotatable element and spaced radially therefrom such that an annular clearance is defined therebetween for the flow of fluid therethrough from an inlet end of the annular clearance to an outlet end thereof, the diffuser and inlet flow guide comprising:
    a ring defining a axis and having an outer surface and an inner surface spaced radially inward of the outer surface, and front and rear end faces that extend between the outer and inner surfaces and define opposite ends of the ring;
    the ring defining a plurality of slots formed in the inner surface, each slot extending from the front end face to the rear end face and extending at least partially through a radial thickness of the ring defined between the inner and outer surfaces thereof, each slot having an entrance portion originating at the front end face and extending in a first direction defining a positive helix angle relative to the ring axis, each slot having an exit portion extending in a second direction defining a negative helix angle relative to the ring axis, and each slot defining a flow area that increases from the front end face to the rear end face such that fluid flowing through the slot is diffused.

11. The diffuser and inlet flow guide of claim 10, wherein the entrance portion of each slot defines a helix angle of about 0° to 90° and the exit portion defines a helix angle of about 0° to −90°.

12. The diffuser and inlet flow guide of claim 10, wherein each slot includes a diffuser portion for diffusing fluid flowing therethrough.

13. The diffuser and inlet flow guide of claim 12, wherein the diffuser portion has an exit-to-inlet area ratio less than about 4.

14. The diffuser and inlet flow guide of claim 12, wherein each slot has a turning portion for turning fluid flowing through the slot from a positive helix angle to a negative helix angle.

15. A method of enhancing dynamic stability of an annular fluid film bearing of the type having a rotatable element mounted for rotation about an axis of the bearing and a stationary element mounted concentrically about the rotatable element and spaced therefrom by a radial clearance such that an annular clearance is defined therebetween for the flow of fluid therethrough, the fluid entering the annular clearance having a tangential component of velocity in the direction of rotation of the rotatable element caused at least in part by entrainment of fluid with the rotatable element, the method comprising:
    turning the fluid entering the annular clearance so as to reduce the tangential velocity thereof in the direction of rotation of the rotatable element; and
    diffusing the fluid so as to increase the static pressure of the fluid entering the annular clearance.

16. The method of claim 15, wherein the step of turning the fluid comprises turning the fluid such that the fluid entering the annular clearance has a tangential component of velocity opposite to the rotation of the rotatable element.

17. The method of claim 15, wherein the turning step comprises turning the fluid such that the fluid entering the annular clearance is directed in a circumferential direction opposite to the direction of rotation of the rotatable element.

18. The method of claim 15, wherein the turning step follows the diffusing step.

19. The method of claim 15, wherein the turning step comprises passing the flow through a variable-cross-section flow passage whose shape varies in the flow direction.

* * * * *